W. N. SPRINGER.
PLOW.
APPLICATION FILED MAY 8, 1913.
1,084,972.
Patented Jan. 20, 1914.
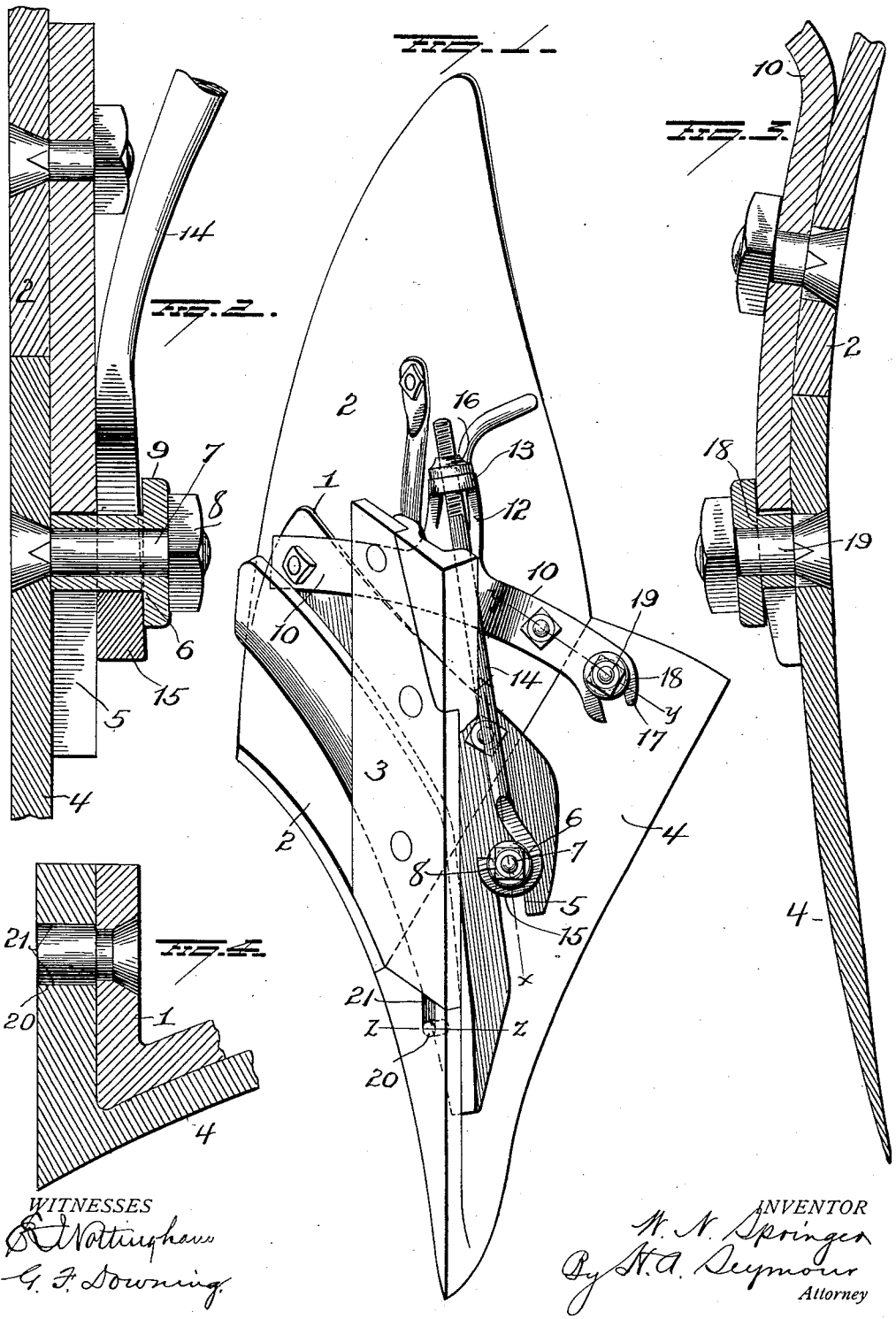
WITNESSES
INVENTOR
W. N. Springer
By H. A. Seymour
Attorney

UNITED STATES PATENT OFFICE.

WILLIAM N. SPRINGER, OF SOUTH BEND, INDIANA, ASSIGNOR TO OLIVER CHILLED PLOW WORKS, OF SOUTH BEND, INDIANA.

PLOW.

1,084,972.  Specification of Letters Patent.  Patented Jan. 20, 1914.

Application filed May 8, 1913. Serial No. 766,342.

*To all whom it may concern:*

Be it known that I, WILLIAM N. SPRINGER, of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

My improvement relates to an improvement in plows.

In gang plows as now used, it is exceedingly difficult owing to the width of the gangs, to get at the bolts and nuts which secure the blades or wings to the plow standards for the purpose of renewal and replacement of the blades and wings, and the object of this invention is to provide means located and operable at the rear of the plow for drawing the blade or wing into position with relation to the moldboard and landside, and for locking it against the possibility of accidental displacement.

With these ends in view my invention consists in the parts and combinations of parts as will be more fully explained and pointed out in the claim.

In the accompanying drawings, Figure 1 is a view in perspective of the underside of a plow; Fig. 2 is a view in section on the line $x$—$x$ of Fig. 1; Fig. 3 is a view on the line $y$—$y$ of Fig. 1 and Fig. 4 is a view on the line $z$—$z$ of Fig. 1.

1 represents a plow standard which may be of malleable or cast metal. This standard is approximately V-shape in cross section, one side member of which carries the moldboard 2, and the other side member carries the landside 3, the said moldboard and landside being secured to the standard by bolts and nuts. The lower end or foot of the standard 1 is enlarged and projects below the moldboard, and in front of the latter and also in front of the landside, to form a support for the blade or wing 4.

The lower end or foot of the standard is provided with a slot 5 which projects rearwardly and upwardly for the passage of the thimble 6 embracing the bolt 7, carried by the blade 4. The head of the bolt 7 rests in a countersunk opening in the blade so as to rest flush with the outer surface of the latter, and the thimble on said bolt is held in place by the nut 8, the thimble being provided with a head 9 against which the nut bears.

Secured to the inner face of one side of the standard 1, and also to the moldboard adjacent the rear lower edge of the latter, is the brace 10, the lower end of which terminates below the lower edge of the mold board adjacent the heel of the blade or wing, and is provided at its lower end with a rearwardly and upwardly projecting slot 17, the latter being open at its forward end. The brace 10 is arched and is provided adjacent its center with a rearwardly projecting bracket 12, terminating at its rear end in a right angle lip 13, the latter having a hole through the same for the passage of the rear end of the hook rod 14, the hook of which engages the thimble 6 on bolt 7, which latter as previously explained is carried by the blade 4. This hook, 15, as clearly shown in Fig. 2, is made wedge shape, so that as the rod 14 is drawn rearwardly and upwardly by the handle nut 16 screwed onto the rear end of the rod, it operates to not only draw the upper edge of the blade into close and continuous contact with the lower edge of the mold board, but the wedge bearing at one side against the inner face of the foot of the standard, and at its opposite side against the head 9 of thimble 6, operates to draw the blade solidly into contact with the outer face of the foot of the standard and hold it there against the possibility of accidental displacement. The blade is also supported adjacent its heel by the lower depending end of the brace 10 which is also provided with an upwardly and rearwardly inclined slot 17, the free end of said brace being wedge shaped as shown in Fig. 3. The blade 4 carries a thimble 18 mounted on the stud or bolt 19, and so located with relation to the thimble 6, that as the latter is entered and moved in slot 5 in the foot of standard 1, the thimble 18 will enter the open slot 17 in brace 10, and as the wing is pulled rearwardly by the hook bolt 14, the thimble 18 moving in slot 17, with its head in contact with the wedge shaped surface of the free end of brace 10, will pull the heel end of wing 4 into contact with said brace and flush with the heel of the mold board.

The rear end of the nose or point of the wing is held in alinement with the cutting edge of the mold board, by the lug 20 projecting from the foot of the standard and entering slot 21 at the rear end of the landside wall of the nose of the plow.

With this construction, by loosening hook rod so as to disengage the hook from thimble 6, the entire blade and its integral nose or point are free to be removed by a blow or push on the heel of the blade. A new blade can be passed from the rear of the plow under and over the front end of the foot of the standard, and by then coupling up the hook rod to the thimble the blade can be drawn rearwardly and upwardly to position and locked in place against the possibility of accidental displacement.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

In a plow, the combination with a standard, and a brace fixed with relation to the standard and mold board and projecting below the mold board, the lower end of the standard and brace having open slots, the side walls of the slot in the brace being wedge shaped, of two projections carried by the blade, one to enter the slot in the foot of the standard and the other the slot in the brace, each projection having a head, a hook rod, the hook of which engages the projection in the slot of the standard and means for drawing said rod rearwardly whereby the blade will be drawn into contact with the forward end of the mold board, and down and into contact with the brace.

In testimony whereof, I have signed this specification in the presence of two subscribing witnesses.

WILLIAM N. SPRINGER.

Witnesses:
 EDWIN NICAR,
 RUDOLPH J. ALTGELT.

---

Copies of this patent may be obtained for five cents each, by addressing the "Commissioner of Patents, Washington, D. C."